C. BOUILLON.
MOLDING MACHINE.
APPLICATION FILED OCT. 15, 1912.

1,069,382.

Patented Aug. 5, 1913.

3 SHEETS—SHEET 1.

WITNESSES:
H. W. Meade
S. W. Atherton

INVENTOR
Constant Bouillon
BY
A. M. Wooster
ATTORNEY

C. BOUILLON.
MOLDING MACHINE.
APPLICATION FILED OCT. 15, 1912.

1,069,382.

Patented Aug. 5, 1913.

3 SHEETS—SHEET 2.

WITNESSES:
H. W. Meade
S. W. Atherton

INVENTOR
Constant Bouillon
BY
A. M. Brooker
ATTORNEY

C. BOUILLON.
MOLDING MACHINE.
APPLICATION FILED OCT. 15, 1912.
1,069,382.
Patented Aug. 5, 1913.
3 SHEETS—SHEET 3.
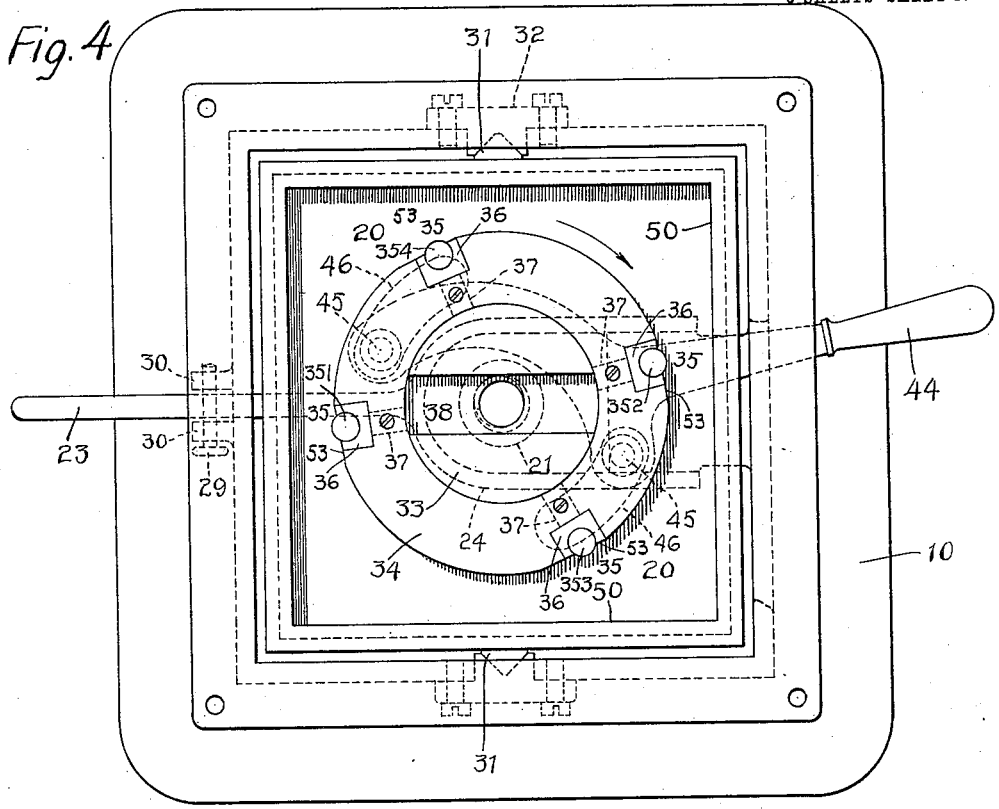
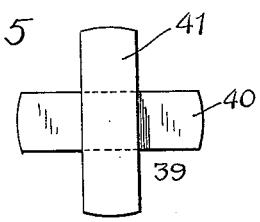
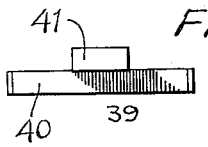
WITNESSES:
H. W. Meade
S. W. Atherton
INVENTOR
Constant Bouillon
BY
A. M. Wooster
ATTORNEY
COLUMBIA PLANOGRAPH CO., WASHINGTON, D. C.

UNITED STATES PATENT OFFICE.

CONSTANT BOUILLON, OF TORRINGTON, CONNECTICUT.

MOLDING-MACHINE.

1,069,382.   Specification of Letters Patent.   Patented Aug. 5, 1913.

Application filed October 15, 1912.   Serial No. 725,837.

*To all whom it may concern:*

Be it known that I, CONSTANT BOUILLON, a citizen of the United States, residing at Torrington, county of Litchfield, State of Connecticut, have invented an Improvement in Molding-Machines, of which the following is a specification.

This invention relates to molding machines generally and has for its objects to simplify, cheapen and to generally improve their construction and mode of operation and to render them perfectly reliable and more especially to provide means for facilitating the withdrawal of the pattern from the mold by imparting a four direction movement to the pattern, thereby slightly enlarging the impression in the mold, and leaving the pattern at the exact center of the impression. In other words, I leave a pre-determined space on all sides of the pattern, so that the pattern will not drag the sand in withdrawal, but may be withdrawn without injury to the mold even if the sides are vertical. With these and other objects in view I have devised the novel molding machine which will be hereinafter described and then particularly pointed out in the claims hereunto appended.

Figure 1:
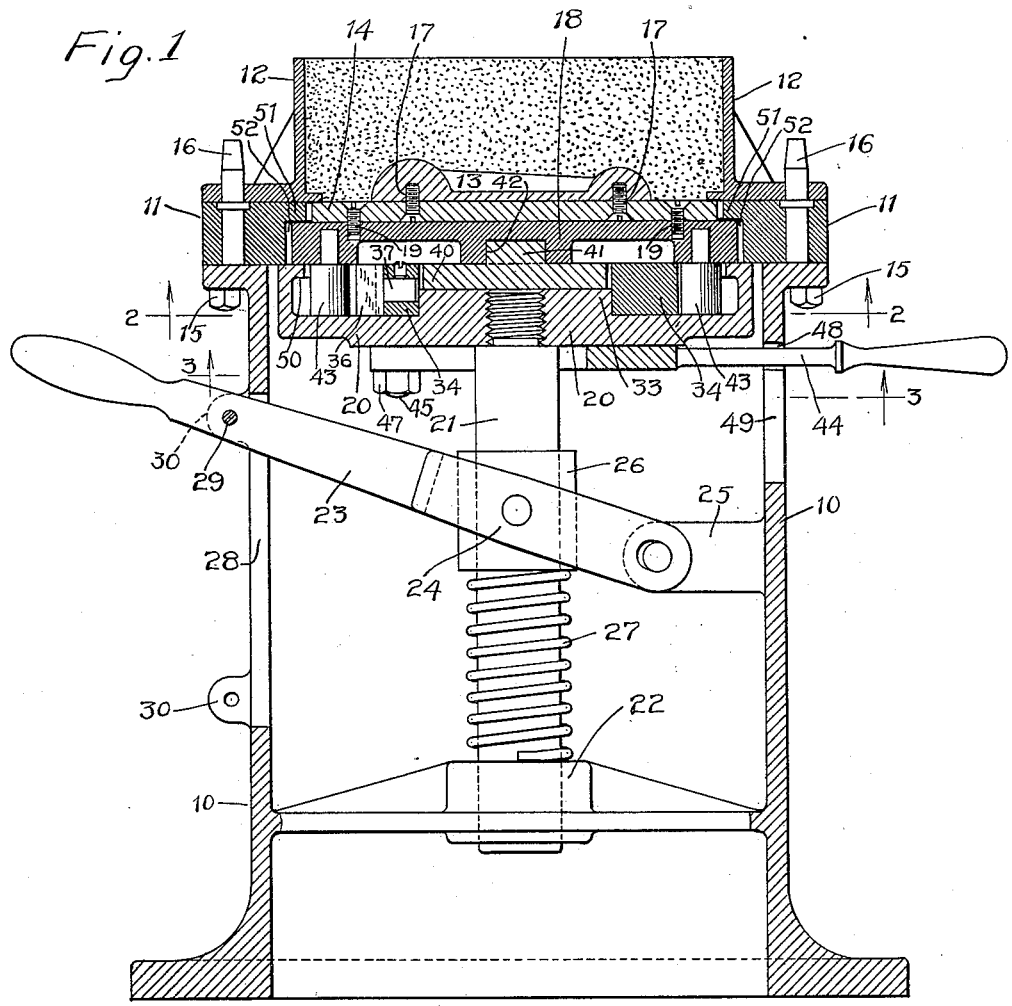
Figure 2:
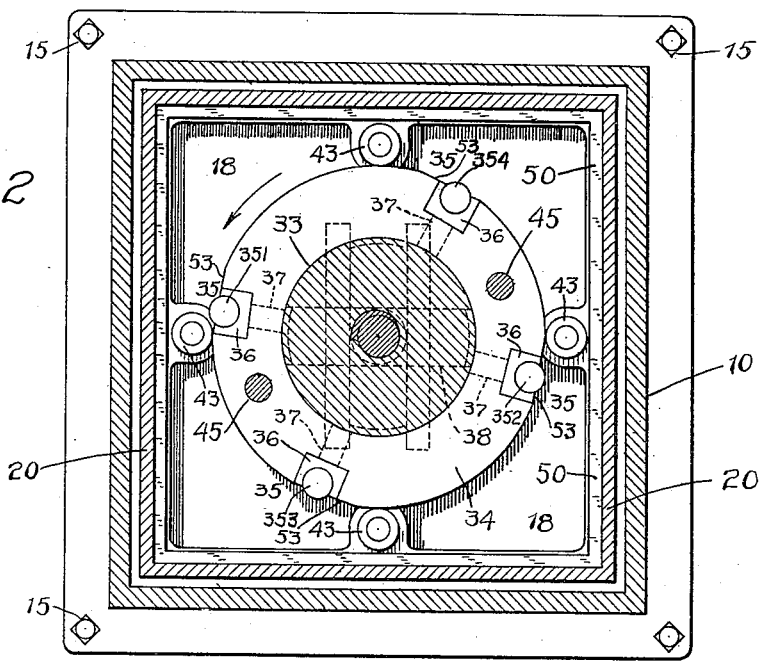
Figure 3:
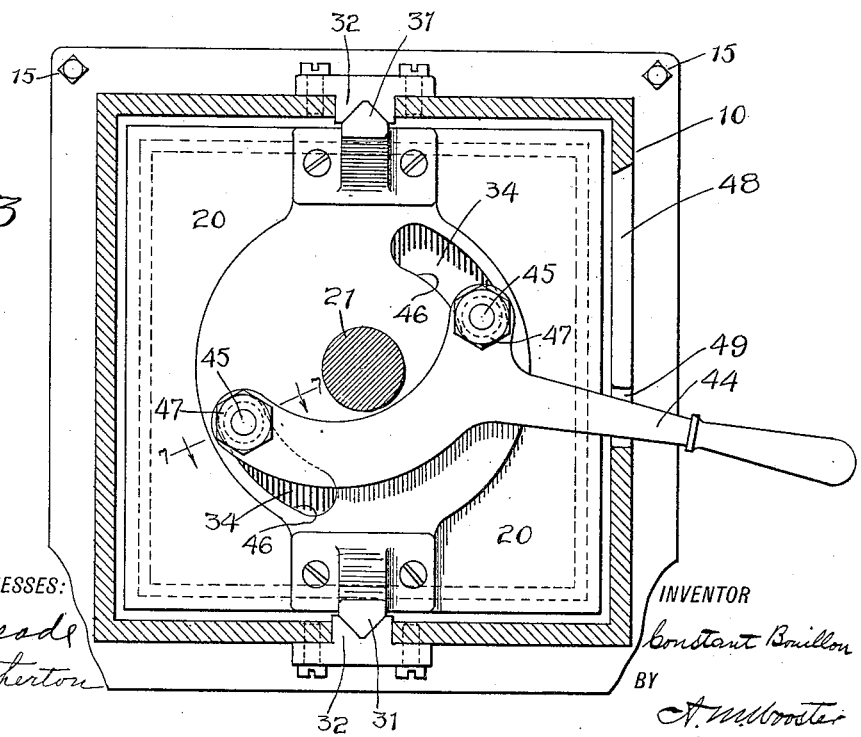

In the accompanying drawings forming a part of this specification in which similar reference characters denote like parts in all the views, Figure 1 is a sectional elevation illustrating the application of the invention to a hand molding machine; Fig. 2 a section on the line 2—2 in Fig. 1, looking in the direction of the arrows; Fig. 3 a section on the line 3—3 in Fig. 1, looking in the direction of the arrows; Fig. 4 a plan view showing the table and cam ring, the pattern plate, vibrating plate and guide block being removed, Fig. 5 a plan view and Fig. 6 an elevation of the guide block detached, and Fig. 7 is a detail sectional view on the line 7—7 in Fig. 3, looking in the direction of the arrows.

10 denotes frame work, 11 a flask frame having the usual opening for a pattern plate, 12 a flask, 13 a pattern, and 14 a pattern plate. The frame work may be of any ordinary or preferred construction or design. The flask frame is rigidly secured thereto, as by bolts 15, and the flask is detachably secured to the flask frame by means of pins 16 rigidly seated in the flask frame and passing through holes in plates extending from the ends of the flask or the pins and holes may be reversed. The patterns are shown as secured to the pattern plate by screws 17 and the pattern plate is shown as secured to a vibrating plate 18 by screws 19.

20 denotes the table, carried by a vertically movable plunger 21. The lower end of the plunger is supported by a hub 22 on a cross piece of the frame work. An operating lever 23 carries a yoke 24, the arms of which are loosely pivoted to lugs 25 upon the frame work and which straddles and is pivoted on a sleeve 26, itself rigidly secured to the plunger. A spring 27 bearing against the sleeve and the hub acts to raise the plunger and the table. The operating lever moves in a slot 28 in the frame work and may be locked either at the raised position as in Fig. 1 for the operation of ramming, or in the lowered position, against the power of the spring, when the pattern is withdrawn from the mold, by means of a locking pin 29 which may be passed through the lever and through upper and lower pairs of ears 30 on the frame work. Opposite sides of the table, see Fig. 3, are provided with ribs 31 which engage guides 32 on the frame work. These guides and ribs in connection with hub 22 through which the plunger passes insure perfect steadiness of movement of the table and parts carried thereby.

The four direction movement of vibrating plate 18 is produced as follows: At the center of the table is a hub 33 surrounding which is a cam ring 34 provided with adjustable bosses 35. These bosses are preferably made of hardened steel and set in blocks 36 which are recessed into the ring and are made adjustable by means of shanks 37 which engage the ring and are locked in place by set screws. In the top of hub 33 is a groove 38 for a slide block 39 which carries the vibrating plate. This block is cross shaped in plan and consists simply of an arm 40 and a superposed arm 41 lying at right angles thereto. Arm 40 engages the groove in the hub and slides therein with the vibrating plate and arm 41 engages a groove 42 in the underside of the pattern plate, shown in the present instance as formed by two parallel ribs, and permits the vibrating plate to move at right angles to its other movement, as will presently be more fully explained. The vibrating plate is provided on its underside with rolls 43 which normally engage the periphery of the cam ring.

As shown in the drawings, metal is removed from the underside of the vibrating plate for lightness and the roll studs are shown as engaging inward projections. The cam ring may be oscillated to impart vibratory movement to the vibrating plate in any suitable manner. In the present instance, I have shown the cam ring as connected to an operating arm 44 by means of studs 45 which lie in slots 46 in the table and are provided with reduced upper ends which have threaded engagement with the cam ring, and threaded lower ends which are engaged by nuts 47. In Fig. 2, the bosses 35 are shown at their normal position with relation to the rolls. In order that the vibrating plate may be moved in one direction and then back again, then at right angles and then back again to its normal position, it is necessary that the bosses should be placed at progressively increasing distances from the corresponding rolls. In order to clearly illustrate the operation of the bosses on the rolls, I have specifically indicated the first boss to engage a roll by 351, the second by 352, the third by 353 and the fourth by 354. It will be noted that contiguous to each block 36 the periphery of the cam ring is removed leaving a flat indicated by 53. The object of these flats is to temporarily interrupt the engagement of the periphery of the cam ring with the rolls and to permit a roll and the vibrating plate to be moved inward slightly when the opposite roll is engaged by a boss to move it outward. At all other times, that is except when a boss is in engagement with a roll, the periphery of the ring is in engagement with the rolls thereby insuring the return to and the retention of the pattern at the exact center of the impression in the mold until the vibrating plate is again moved by the engagement of another boss with a roll. A horizontal slot 48 is provided in the frame work to permit the oscillatory movements of the operating arm and a vertical slot 49 in which it lies when the table is moved upward or downward by the operating lever. The table is shown as provided with an inwardly extending flange 50 which provides ample bearing surface for the vibrating plate. The upward movement of the table is limited by its engagement with the flask frame, as clearly shown in Fig. 1. The flask frame is shown as provided with an inwardly extending flange 51. It should be noted, however, that the vibrating plate does not contact with this flange which merely overhangs it and acts to prevent the entrance of dirt into the recess 52 between the vibrating plate and the flask frame.

The operation is briefly as follows: The table and parts carried thereby, including a pattern or patterns, are raised to the position shown in Fig. 1 and are locked there by pin 29. Sand is then shoveled into the flask and is rammed in any ordinary or preferred manner to form the mold. After the ramming operation the operator oscillates arm 44 causing oscillatory movement of the cam ring and causing the bosses 35 thereon to engage the rolls on the vibrating plate and impart vibratory movement thereto. As there are four rolls on the vibrating plate and four bosses on the cam ring it follows that a four direction movement will be imparted to the vibrating plate. In Fig. 2, the movement of the cam ring will be in the direction of the arrow. Boss 351 will engage a roll on the vibrating plate and move it toward the right. An instant later boss 352 will engage a roll and move the plate in the opposite direction. An instant later boss 353 will engage a roll and move the plate at right angles, that is in the direction of the top of the sheet. An instant later boss 354 will engage a roll and move the plate in the opposite direction, thus imparting a four direction movement to the vibrating plate and leaving the pattern in the exact center of the slightly enlarged pattern impression in the mold. These movements of the vibrating plate are made possible by slide block 39 which reciprocates in one path of movement with the vibrating plate and permits said plate to reciprocate independently in a path at right angles to said first mentioned movement. When the first and second movements of the vibrating plate take place, said plate will carry the slide block through the engagement of upper arm 41 with the groove in the vibrating plate, lower arm 40 sliding in the groove in hub 33 on the table. When the third and fourth movements of the vibrating plate take place, no movement will be imparted to the slide block but the vibrating plate will slide on upper arm 41 of the slide block. I wish to make it clear that after this movement of the vibrating plate, no portion of the mold is in contact with the pattern but there is a slight space between the pattern and the mold which allows the pattern to be withdrawn without danger of dragging sand even should the sides of the pattern be vertical. This space may be varied by adjustment of the bosses on the cam ring. After the vibrating operation, the operator removes pin 29, lowers the table and parts carried thereby by means of the operating lever and locks them at the lowered position by means of pin 29. The pattern is now wholly out of the mold and the flask and mold may be removed from the flask frame without possibility of contact with the pattern. The table is then raised again and the machine is ready to receive another flask.

Having thus described my invention I claim:

1. In a molding machine the combination with a flask frame, a pattern plate and a vertically movable table, of a vibrating plate to which the pattern plate is secured and which is carried by the table, and means carried by the table for imparting forward and backward movement to the vibrating plate and then forward and backward movement at right angles to the first movement.

2. In a molding machine the combination with a vertically movable table and a vibrating plate, of means carried by the table for reciprocating the vibrating plate and then reciprocating said plate at right angles to its former movement and in the same plane.

3. In a molding machine the combination with a flask frame and a pattern plate, of a vertically movable table, a vibrating plate and a slide block intermediate the vibrating plate and the table, upon which the vibrating plate is adapted to slide and which is adapted to slide on the table, carrying the vibrating plate, at right angles to the first mentioned movement of the plate.

4. In a molding machine the combination with a flask frame and a pattern plate, of a vertically movable table, a vibrating plate and a slide block intermediate the vibrating plate and the table, upon which the vibrating plate is adapted to slide and which is adapted to slide on the table at right angles to said movement of the vibrating plate and means carried by the table for causing said movement.

5. In a molding machine the combination with a flask frame and a pattern plate, of a vertically movable table, an oscillatory cam ring carried thereby, a vibrating plate having means for engagement by the cam ring and a slide block upon which the vibrating plate may slide and which may slide on the table, carrying the vibrating plate, at right angles to said former movement.

6. In a molding machine the combination with a vertically movable table having a central hub, a groove in said hub and an oscillatory cam ring provided with bosses, of a vibrating plate having means for engagement by said bosses and a groove at right angles to the groove in the hub and a slide block having arms engaging said grooves.

7. In a molding machine the combination with a vertically movable table and an oscillatory cam ring carried thereby, having flats on its periphery and bosses on said flats, of a vibrating plate having means for engagement by the bosses and a slide block upon which the plate may slide and which may slide at right angles carrying the plate.

8. In a molding machine the combination with a vertically movable table and a vibrating plate having engaging means, of an oscillatory cam ring provided with flats and bosses on its periphery, said flats and bosses being placed at progressively increasing distances from the corresponding engaging means on the vibrating plate, and a slide block upon which said plate may slide and which may slide at right angles carrying the plate.

9. In a molding machine the combination with a vertically movable table and a vibrating plate, of means intermediate the table and the vibrating plate for imparting vibration to said plate in paths at right angles to each other and in the same plane.

10. In a molding machine the combination with a vertically movable table and a vibrating plate having engaging means, of an oscillatory cam ring having flats on its periphery and bosses on the flats for engaging the vibrating plate, and a slide block on which the vibrating plate may slide and which may slide on the table, carrying the plate, at right angles to said former movement.

11. In a molding machine the combination with a vertically movable table and a vibrating plate having engaging means, of an oscillatory cam ring having flats on its periphery and bosses on the flats for engaging the vibrating plate, said flats and bosses being at progressively increasing distances from the engaging means on the vibrating plate and a slide block intermediate the vibrating plate and the table, substantially as described, for the purpose specified.

12. In a molding machine the combination with a vertically movable table and a vibrating plate having engaging means, of an oscillatory cam ring having flats on its periphery, bosses on said flats for engaging the vibrating plate, and means for adjusting said bosses, and a slide block intermediate the vibrating plate and the table, substantially as described, for the purpose specified.

13. In a molding machine the combination with a vertically movable table having a groove and a vibrating plate having a groove at right angles to the groove in the table, of a slide block comprising arms engaging said grooves and a cam ring having bosses adapted to engage the vibrating plate.

14. In a molding machine the combination with a flask frame, a flask and a pattern plate, of a vertically movable table, a vibrating plate carried thereby to which the pattern plate is secured and means for imparting four direction movement to the vibrating plate, whereby a pattern is loosened in the sand and returned to the center of the impression.

15. In a molding machine the combination with a flask frame, a flask and a pattern plate, of a vertically movable table, a vibrating plate carried thereby to which the pattern plate is secured and means for reciprocating said plates and then reciprocating said plates at right angles to their former movement and in the same plane.

16. In a molding machine the combination with a flask frame, a flask and a pattern plate, of a vertically movable table, a vibrating plate carried thereby to which the pattern plate is secured, an oscillatory cam ring which is engaged by the vibrating plate and is provided with flats and bosses, for the purpose set forth, and a slide block adapted to reciprocate on the table and on which the vibrating plate is adapted to reciprocate at right angles to the former movement.

17. In a molding machine the combination with a vertically movable table, a vibrating plate carried by the table and means also carried by the table for imparting four direction movement to the vibrating plate, of a flask frame which is engaged by the table to limit its upward movement and is provided with an inwardly extending flange which overhangs the vibrating plate without contact therewith.

18. In a molding machine the combination with a flask, a pattern plate and a vibrating plate to which the pattern plate is secured, of means for reciprocating said plates and then reciprocating said plates at right angles to the former movement and in the same plane, and leaving them at their normal position.

19. In a molding machine the combination with a flask, a pattern plate and a vibrating plate carrying the pattern plate and provided with engaging means, of a cam ring having flats and bosses at progressively increasing distances from the corresponding engaging means on the vibrating plate, and a slide block adapted to reciprocate carrying the vibrating and pattern plates and on which said plates are adapted to reciprocate at right angles to the former movement.

In testimony whereof I affix my signature in presence of two witnesses.

CONSTANT BOUILLON.

Witnesses:
EDWARD W. CARTER,
GEO. F. PENLEY.

---

Copies of this patent may be obtained for five cents each, by addressing the "Commissioner of Patents, Washington, D. C."